(12) United States Patent
Braak et al.

(10) Patent No.: US 11,204,311 B2
(45) Date of Patent: Dec. 21, 2021

(54) ENGRAVING DEVICE AND METHOD FOR CREATING AND MEASURING STRESS CORROSION CRACKING ON A FLAT COATED TEST SPECIMEN

(71) Applicant: Robert Bosch GmbH, Stuttgart (DE)

(72) Inventors: Richard Braak, Stuttgart (DE); Ulrich May, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/766,804

(22) PCT Filed: Oct. 15, 2018

(86) PCT No.: PCT/EP2018/077986
§ 371 (c)(1),
(2) Date: May 26, 2020

(87) PCT Pub. No.: WO2019/101435
PCT Pub. Date: May 31, 2019

(65) Prior Publication Data
US 2020/0371017 A1 Nov. 26, 2020

(30) Foreign Application Priority Data
Nov. 23, 2017 (DE) ..................... 10 2017 220 946.1

(51) Int. Cl.
*G01N 19/04* (2006.01)
*B44B 3/00* (2006.01)
(52) U.S. Cl.
CPC ............. *G01N 19/04* (2013.01); *B44B 3/009* (2013.01)
(58) Field of Classification Search
CPC ................... G01N 19/04; G01N 33/32; G01N 2203/0091; B44B 3/009

(Continued)

(56) References Cited

U.S. PATENT DOCUMENTS

| 4,561,814 A | 12/1985 | Dahlgren, Jr. et al. |
| 2010/0206057 A1* | 8/2010 | Batchelder ............. G01N 19/04 73/105 |

(Continued)

FOREIGN PATENT DOCUMENTS

GB   2296788   7/1996

OTHER PUBLICATIONS

International Search Report for Application No. PCT/EP2018/077986 dated Oct. 15, 2018 (English Translation, 4 pages).

(Continued)

*Primary Examiner* — Robert R Raevis
(74) *Attorney, Agent, or Firm* — Michael Best & Friedrich LLP

(57) ABSTRACT

The invention relates to a method for carrying out a test and measuring method on a flat test specimen (1), wherein a mechanical load is introduced into a test specimen surface (2) by means of a rotating engraving head (3) of an engraving device (4), wherein the engraving head (3) penetrates with a defined contact pressure at least into a layer system (5) applied to the test specimen (1), wherein the rotating engraving head (3) is moved along the test specimen surface (2) and relative to the test specimen (1) in order to create at least one engraving (6) on the test specimen surface (2) by plastic deformations and/or brittle chipping of the layer system (5), and wherein the at least one engraving (6) introduced into the test specimen surface (2) is measured using a photo-optical method in order to evaluate layer adhesion of the layer system (5) to the main body (11). The invention also relates to an engraving device (4) for carrying out such a method.

10 Claims, 1 Drawing Sheet

(58) Field of Classification Search
USPC .......... 73/804, 799, 800, 823, 150 R, 150 A
See application file for complete search history.

(56) References Cited

U.S. PATENT DOCUMENTS

2012/0103080 A1* 5/2012 Kuster ................. G01N 3/56
73/150 A
2017/0182837 A1 6/2017 Matsushita et al.

OTHER PUBLICATIONS

Randall et al., "The effect of intrinsic parameters on the critical load as measured with the scratch test method," Surface and Coatings Technology, vol. 137, No. 2-3, Mar. 1, 2001, pp. 146-151.
Warcholinski et al., "Multiliayer coatings on tools for woodworking," Wear, Elsevier Sequoia, Lausanne, CH, vol. 271, No. 11, May 20, 2011, pp. 2812-2820.

* cited by examiner

ENGRAVING DEVICE AND METHOD FOR CREATING AND MEASURING STRESS CORROSION CRACKING ON A FLAT COATED TEST SPECIMEN

BACKGROUND OF THE INVENTION

The invention relates to a method for creating and measuring stress corrosion cracking on a flat coated test specimen which has a basic body with a basic body surface and, applied thereto, a layer system with a boundary surface adjoining the basic body surface. The invention further relates to an engraving device for carrying out such a method.

The general prior art discloses methods for measuring layer adhesion on a product having a coating, wherein the coating consists of substrate materials with thin coatings. The coating can be a coating of a tool or of a component of a mechanical system, with the aim of wear prevention. Moreover, such coatings can take the form of corrosion protection coatings or decorative coatings, wherein the coatings are applied to the product by means of a spraying or painting method, or by means of an electroplating or plasma coating method. Examples of measuring methods known for measuring the layer adhesion of the coating are the measurement of the layer adhesion by means of Rockwell indentation in accordance with VDI Guideline 3198, the scratch test in accordance with DIN EN 1071-3 or the Taber abraser test. The measuring methods for measuring the layer adhesion create a mechanical load on the layer-substrate boundary surface in order to bring about detachment of the coating in the case of inadequate layer quality. The point of mechanical loading is examined by light-optical methods, and the visual appearance of the delamination is subjectively evaluated using a comparison catalog.

SUMMARY OF THE INVENTION

Proceeding from the aforementioned prior art, the object on which the invention is based is to further develop an engraving device and a method for creating and measuring stress corrosion cracking on a flat coated test specimen, and in particular to provide simple flat testing of a test specimen with regard to stress corrosion cracking.

According to a method according to the invention for creating and measuring stress corrosion cracking on a flat coated test specimen which has a basic body with a basic body surface and a layer system with a boundary surface adjoining the basic body surface, a mechanical load is introduced into a test specimen surface by means of a rotating engraving head of an engraving device, wherein the engraving head at least partially penetrates into the layer system with a constant pressing force and at a constant rotational speed. The rotating engraving head is then moved at a constant movement speed along the test specimen surface and relative to the test specimen, and at least one engraving is created on the test specimen surface by plastic deformations and/or brittle chipping of the layer system. The at least one engraving introduced into the test specimen surface is then measured by a light-optical method in order to evaluate a layer adhesion of the layer system on the basic body. In other words, the engraving head is first of all made to rotate at a preferably constant rotational speed by a drive unit and then pressed with a constant pressing force onto the test specimen surface. The engraving head is subsequently guided at a constant movement speed over the test specimen surface, resulting in an engraving in the test specimen.

Alternatively, the sample table on which the test specimen is fixed can also be moved. In this case, the sample table is preferably positionable in three dimensions in order to move the test specimen in the direction of the rotating engraving head and in any desired direction in the table plane so as to create the at least one engraving.

The pressing force and the rotational speed of the engraving head and the movement speed of the sample table or of the engraving head are preferably monitored and controlled by means of a control unit. The control unit thus allows one or more engravings to be created on a comparatively large area of the test specimen surface in order that, by means of light-optical methods, there can subsequently be determined the layer adhesion of the layer system in the boundary surface between the basic body surface and the layer system. The pressing force is chosen to be of such magnitude that the basic body is at least partially exposed, but excessive plastic deformations are avoided. The maximum mechanical stressing is advantageously present in the vicinity of the boundary surface between the layer system and the basic body. The pressing force preferably lies in a range between 0.1 and 5 N. The rotational speed of the engraving head is preferably at least 5,000 and at most 30,000 revolutions per minute. The movement speed of the engraving head or of the sample table is dependent on the layer thickness of the layer system, the movement speed decreasing as the layer thickness increases. Alternatively, as the layer thickness increases, a larger engraving head can also be used. The movement speed is preferably between 1 and 10 cm/s.

In other words, this method makes it possible, by large-area analyses of the test specimen surface, for a delamination of the layer system from the basic body to be analyzed. It is advantageous here that flat testing of the test specimen with respect to stress corrosion cracking and delamination can be carried out with little outlay, and, moreover, the requirements which have to be met by the test specimen geometry are not stringent. Consequently, the test specimen surface is planar in design.

Furthermore, the method for creating and measuring stress corrosion cracking can be carried out by suitable adaptation of the engraving device at high and/or low temperatures. In other words, the measurement of high-temperature and low-temperature adhesion of the layer system can be carried out by means of such an engraving device.

The layer system is preferably in the form of a single layer, although multilayer layer systems, for example consisting of a hydrogen-containing amorphous carbon layer (a-C:H) and a titanium intermediate layer, are also conceivable. The titanium intermediate layer here serves in particular as an adhesion promoter layer and is arranged between the basic body, which is preferably a steel material, and the carbon layer.

The loading of the test specimen surface results in a targeted overload in the layer system that leads to damage as a result of layer shattering and delamination. Such damage leads to a high susceptibility to stress corrosion cracking. The stress corrosion cracking is manifested preferentially in brittle coatings of metal components, in particular in the case of thin layers. Forces are introduced here in particular in the vicinity of the boundary surface between the basic body and the layer system. Consequently, the loading creates a local overloading, that is to say a plastic deformation of the test specimen surface in combination with large shear forces on the test specimen. This results in layer-internal fractures, which are also referred to as layer-in-layer delaminations, and which finally lead to the delamination of the layer system from the basic body. The adhesion properties of the layer system or of the coating are dependent on the chemical resistance of the layer system. In the case of multilayer coatings, the adhesion properties are dependent in particular on the chemical resistance of the boundary surface of the adhesion promoter layer and of the cover layer.

According to a measure which further improves the invention, it is proposed that the test specimen surface is at least partially covered with a corrosive medium in order to accelerate a stress corrosion cracking of the test specimen by local delaminations between the layer system and the basic body of the test specimen. After the acceleration of the stress corrosion cracking by means of the corrosive medium, the at least one engraving introduced into the test specimen surface is then measured by a light-optical method, and the layer adhesion of the layer system on the basic body is evaluated. In other words, the test specimen surface is exposed to the corrosive medium particularly after the engravings have been created. Here, the test specimen can be placed in a separate container, which contains the corrosive medium and is stored for a certain duration with certain test parameters, such as, for example, temperature of the medium or else stationary or movable corrosive medium. The longer the test specimen is exposed to the corrosive medium, the greater is the resultant effect of the stress corrosion cracking. The corrosive medium is therefore particularly suitable for accelerating damage to the test specimen as a result of stress corrosion cracking, that is to say a delamination of the layer system. As a result, the test specimen can be examined on the basis of the application. A suitable corrosive medium is in particular a fuel or urea, a body fluid or water. Acids or alkalis are also suitable as corrosive medium.

Apart from the measurement of the delamination, the method described also makes it possible to analyze and characterize further layer properties of the layer system, such as, for example, the brittleness of the layer system.

An engraving device according to the invention for carrying out a method for creating and measuring stress corrosion cracking on a flat test specimen comprises a three dimensionally movable sample table for receiving the test specimen and also comprises a rotatable engraving head which is provided to load a test specimen with a defined pressing force and at a defined rotational speed. Consequently, the engraving head is guided over the test specimen surface in order to create at least one engraving on the test specimen. Alternatively, the engraving head can also be designed to be movable three dimensionally in order to subject the test specimen to the pressing force and in order to be guided over the test specimen surface. Here, the test specimen is arranged in a positionally fixed manner on the immovable sample table. The engraving device is used particularly for carrying out the above-described method for creating and measuring stress corrosion cracking on a flat test specimen.

According to a preferred exemplary embodiment, the engraving head has a diamond coating. Consequently, the engraving head has a greater hardness than the test specimen and is therefore suitable particularly for creating at least one engraving on the test specimen surface. The engraving head is preferably spherical, with it also being possible for the engraving head to be disk-shaped.

The invention includes the technical teaching that a light microscope is provided for the light-optical measurement and evaluation of the at least one engraving introduced into the test specimen surface. The light microscope preferably allows a 30-fold to 300-fold magnification. It is thus possible for adhesion information relating to the layer system to be obtained even immediately after the at least one engraving has been created.

BRIEF DESCRIPTION OF THE DRAWINGS

A preferred exemplary embodiment of the invention is explained in more detail below on the basis of the two figures, in which.

DETAILED DESCRIPTION

Figure 1:
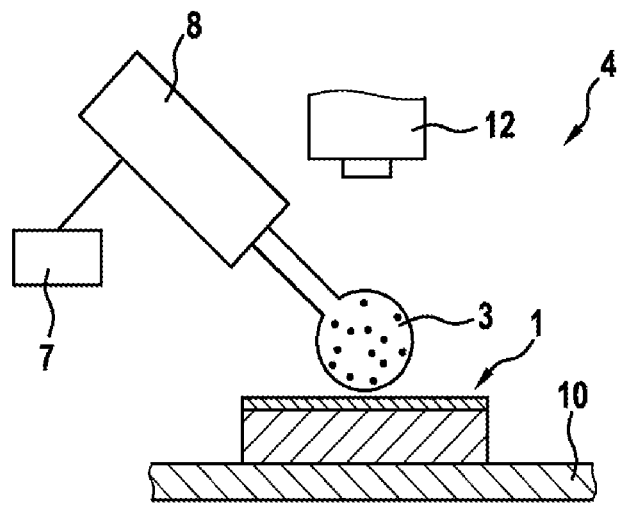
FIG. 1 shows a simplified schematic view of an engraving device according to the invention before an engraving process.

According to FIG. 1, an engraving device 4 for carrying out a method for creating and measuring stress corrosion cracking comprises a three dimensionally movable sample table 10 for receiving a flat coated test specimen 1 and also comprises a rotatable engraving head 3. The engraving head 3 has a diamond coating and is spherical in the present case. Alternatively, the engraving head 3 can also be disk-shaped. In the present case, the engraving device 4 is illustrated immediately prior to the method for creating and measuring stress corrosion cracking on the test specimen 1. The engraving head 3 can be driven by means of a drive unit 8 and is provided to load the test specimen 1 with a constant pressing force and at a constant rotational speed. Furthermore, the engraving device 4 has a light microscope 12 for the light-optical evaluation of at least one engraving 6 introduced into the test specimen surface 2 and illustrated in FIG. 2. In a first step, the sample table 10 is moved counter to the rotating engraving head 3 until the required pressing force has been set.

Figure 2:
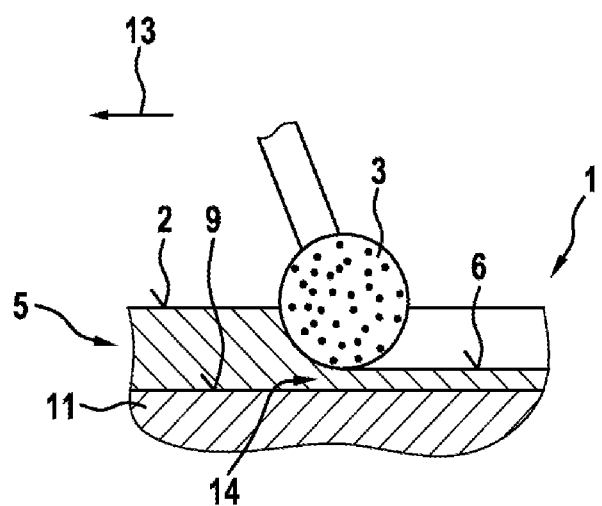
FIG. 2 shows a schematic sectional view of a detail of a test specimen during the engraving process.

According to FIG. 2, in a subsequent step, the engraving 6 is created in a test specimen surface 2 by a movement of the engraving head 3 in an engraving direction 13 relative to the test specimen 1. Here, the sample table 10 is moved at a constant movement speed relative to the test specimen 1. Alternatively, the engraving head 3 can also be moved at a constant movement speed relative to the test specimen 1, in which case the test specimen 1 is secured in a positionally fixed manner on the immovable sample table 10. The test specimen 1 consists substantially of a basic body 11 and has a layer system 5 on the basic body surface 9. The layer system 5 is in the form of a single layer in the present case. However, a multilayer layer system 5 is also conceivable. The engraving head 3 introduces the pressing force particularly into a boundary surface 14 between the basic body 11 and the layer system 5. Alternatively, the engraving head 3 can also introduce the pressing force into the vicinity of the boundary surface between the basic body 11 and the layer system 5. In other words, forces are introduced in the region of the basic body surface 9. The engraving 6 created can then be examined by means of the light microscope 12 according to FIG. 1 and analyzed and evaluated with regard to a layer adhesion of the layer system 5 or a delamination of the layer system 5 from the test specimen 1.

Moreover, in a further step, a corrosive medium can be applied to the test specimen 1 in order to stimulate the stress corrosion cracking in the layer system 5 and to accelerate the corrosion process for measuring the delamination of the layer system 5. Here, the corrosion process is particularly dependent on the duration and the temperature of the corrosive medium. The light microscope 12 according to FIG.

1 can also be used to examine the engraving 6 of the test specimen 1 after a corrosion process by means of the corrosive medium. The magnitude and frequency of the delaminations on the test specimen surface 2 that are discernible by means of the light microscope 12 give information on the adhesion properties of the layer system 5. In addition, it is possible that the rate of any delamination progression is determined by a comparison of delamination fronts at corresponding time points in dependence on the time scale of the stress corrosion cracking. Furthermore, the rate of the delamination can be determined in dependence on the corrosive medium. Consequently, the delamination rate correlates with the rate of the stress corrosion cracking along the boundary surface 14.

The invention claimed is:

1. A method for creating and measuring stress corrosion cracking on a flat coated test specimen (1) which has a basic body (11) with a basic body surface (9) and, applied thereto, a layer system (5) with a boundary surface (14) adjoining the basic body surface (9), the method comprising the following steps:
   introducing a mechanical load into a test specimen surface (2) of the layer system (5) using a rotating engraving head (3) of an engraving device (4), wherein the engraving head (3) at least partially penetrates into the layer system (5) with a constant pressing force and at a constant rotational speed;
   moving the rotating engraving head (3) along the test specimen surface (2) and relative to the test specimen (1) at a constant movement speed in order to create at least one engraving (6) on the test specimen surface (2) by plastic deformations and/or brittle chipping of the layer system (5); and
   measuring the at least one engraving (6) introduced into the test specimen surface (2) by a light-optical method for evaluating the layer adhesion of the layer system (5) on the basic body (11).

2. The method as claimed in claim 1, characterized in that the pressing force and the rotational speed of the engraving head (3) are monitored and controlled by a control unit (7).

3. The method as claimed in claim 2, the method further comprising
   at least partially covering the surface (2) of the test specimen (1) with a corrosive medium in order to accelerate a stress corrosion cracking of the test specimen (1) by local delaminations between the layer system (5) and the basic body (11) of the test specimen (1);
   wherein the measuring the at least one engraving (6) introduced into the surface (2) of the test specimen (1) by the light-optical method for evaluating the layer adhesion of the layer system (5) on the basic body (11) is after the acceleration of the stress corrosion cracking.

4. The method as claimed in claim 1, the method further comprising
   at least partially covering the test specimen surface (2) with a corrosive medium in order to accelerate a stress corrosion cracking of the test specimen (1) by local delaminations between the layer system (5) and the basic body (11) of the test specimen (1);
   wherein the measuring the at least one engraving (6) introduced into the test specimen surface (2) by the light-optical method for evaluating the layer adhesion of the layer system (5) on the basic body (11) is after the acceleration of the stress corrosion cracking.

5. An engraving system (4) for creating and measuring stress corrosion cracking on a flat coated test specimen (1) which has a basic body (11) with a basic body surface (9) and, applied thereto, a layer system (5) with a boundary surface (14) adjoining the basic body surface (9) comprising:
   a three dimensionally movable sample table (10) for receiving the test specimen (1),
   a rotatable engraving head (3) configured to load the test specimen (1) with a defined pressing force and at a defined rotational speed and to create an engraving (6) in a surface (2) of the test specimen (1),
   a light microscope (12) configured for light optical measurement and evaluation of the engraving (6) introduced into the surface (2) of the test specimen (1), and
   a control unit configured to:
      cause the rotatable engraving head (3) to introduce a mechanical load into the surface (2) of the layer system (5) to at least partially penetrate into the layer system (5) with a constant pressing force and a constant rotational speed,
      cause the three dimensionally movable sample table (10) and the rotatable engraving head (3) to move the rotating engraving head (3) along the surface (2) of the test specimen (1) and relative to the test specimen (1) at a constant movement speed in order to create at least one engraving (6) on the test specimen surface (2) by plastic deformations and/or brittle chipping of the layer system (5), and
      cause the light microscope (12) to measure the at least one engraving (6) introduced into the test specimen surface (2) by a light-optical method for evaluating the layer adhesion of the layer system (5) on the basic body (11).

6. The engraving system (4) as claimed in claim 5, characterized in that the engraving head (3) has a diamond coating.

7. The engraving system (4) as claimed in claim 5, characterized in that the engraving head (3) is spherical.

8. The engraving system (4) as claimed in claim 5, characterized in that the engraving head (3) is disk-shaped.

9. The engraving system (4) as claimed in claim 5, wherein the three dimensionally movable sample table (10) is configured to be movable in a desired direction in a table plane so as to create the at least one engraving (6).

10. The engraving system (4) as claimed in claim 5, wherein the engraving head (3) is configured to be to be movable three dimensionally in order to be guided over the surface (2) of the test specimen.

* * * * *